(12) United States Patent
Weiss et al.

(10) Patent No.: US 6,494,161 B1
(45) Date of Patent: Dec. 17, 2002

(54) TEA KETTLE FLUTE

(76) Inventors: Peter Weiss, 300 E. 34th St., Apt. 24D, New York, NY (US) 10016; Joel Haas, 114 Olympus Cir., Jupiter, FL (US) 33477; Darryl Michaelain, 5341 SE. Meadow Springs Blvd., Stuart, FL (US) 34997; Alan Dixon, 400 Rio Vista Blvd., No. 103, Palm Beach Gardens, FL (US) 33410

(*) Notice: Subject to any disclaimer, the term of this patent is extended or adjusted under 35 U.S.C. 154(b) by 51 days.

(21) Appl. No.: 09/670,969

(22) Filed: Sep. 27, 2000

(51) Int. Cl.[7] .............................................. A47J 27/212
(52) U.S. Cl. .................... 116/137 R; 116/101; 116/216; 116/221; 126/388.1
(58) Field of Search ................................ 116/67 R, 70, 116/101, 264, 266, 137 R, 140, DIG. 7, 103, 216, 221; 126/388.1; 99/342, 344

(56) References Cited

U.S. PATENT DOCUMENTS

| | | | | |
|---|---|---|---|---|
| 4,102,294 A | * | 7/1978 | Barber | 116/103 |
| 4,690,095 A | * | 9/1987 | Walls et al. | 116/67 R |
| 4,813,368 A | * | 3/1989 | Hutter, III et al. | 116/137 R |
| 5,950,862 A | * | 9/1999 | Haas et al. | 116/137 R |
| 2001/0029881 A1 | * | 10/2001 | George | 116/137 |

* cited by examiner

Primary Examiner—Andrew H. Hirshfeld
(74) Attorney, Agent, or Firm—McHale & Slavin

(57) ABSTRACT

The present invention is a novelty musical kettle that plays a song when liquid inside the kettle is heated. The kettle body contains a circular flute instrument with a release flap at a first end and a closed second end. When the water is heated, the flap opens allowing pressure to enter the instrument. Also, when the liquid is heated, a release strip releases a rachet which in turn releases a manually pre-wound rotating drum with a drive mechanism. As the drum unwinds, a plurality of multilevel cams along the drum's outer circumference lift a plurality of corresponding actuation valves. The actuation valves unseal and reseal a plurality of apertures along the circular instrument. When the aperture is open, the pressure inside escapes and a musical note is played. The unwinding drum continually unseals and reseals the apertures in a preprogramed manner, thus playing a song.

20 Claims, 3 Drawing Sheets

TEA KETTLE FLUTE

FIELD OF THE INVENTION

This invention relates generally to tea kettles and more particularly to a novelty tea kettle incorporating a programmable flute.

BACKGROUND OF THE INVENTION

It is well known in the art that kettles provide a convenient container for heating water. In particular, kettles used on a kitchen stove are typically referred to as "tea kettles" in view of their primary function, that is preparing the hot water for tea.

Tea kettles are formed from a metal container body capable of holding water, the container capable of withstanding repeated heating from a stove top. The container body is substantially closed with a pour spout that includes a top. Typically the top of the pour spout includes an orifice to allow air expansion during the heating process. In addition, the orifice provides the familiar "whistle" found on tea kettles. Pressure relieved through the orifice results in a low pressure steam whistle which provides an audible signal indicating that the water has reached the boiling point.

Tea kettles can also be specialty items sought by collectors due to their size, style, color, or even unique whistle. For this reason, modifications to the conventional tea kettle include variations on the whistle. For instance, U.S. Pat. No. 4,813,368 discloses a steam driven musical tea kettle that requires a pressure range for proper operation.

What is lacking in the art is a tea kettle having a spring based driver that allows the playing of a flute upon the kettle reaching a predetermined temperature, not dependant upon steam.

SUMMARY OF THE INVENTION

The instant invention is a novelty tea kettle that plays a song when the water inside is heated. In general, the kettle incorporates a flute style that is operated by a spring biased cam. The flute consists of a singular tube having a plurality of apertures that are releasably sealed by actuation valves. The opening and closing of the valves release air pressure from the circular instrument in a strategic location resulting in individual musical notes.

In particular, the kettle includes the circular flute having a release flap at a first end, a closed second end, and a plurality of apertures releasably sealed by actuation valves whose operation and length of opening can be varied by use of a replaceable rotating drum. The rotating drum is rotated by spring, the cam includes a plurality of multilevel cams extending from an outer circumference of the drum. The cams form a continuous circle around the drum with lopes that operate the actuation valves in a momentary open/closed position or provide a continuous tone by placement of the actuation valves in a particular position.

In operation, the rotating drum located on the kettle is manually rotated, wound, to force the drum into a spring biased position and is held in position by a rachet mechanism. When the kettle is heated, a release strip releases the rachet which in turn releases the wound rotating drum. As the drum rotates, the multilevel cams lift the actuation valves corresponding to the cam level. As the actuation valves unseal and reseal the apertures on the circular instrument, pressure from within the kettle is released causing a note of a song to be played.

The release flap at the first end of the circular instrument is opened when the kettle is heated, which can be set for when water boils. Once open, pressure from the kettle is directed into the flute wherein the release strip releases the rachet in turn activating the rotating drum. As a result, the kettle plays a song when the water boils.

In the preferred embodiment, the release flap and release strip are composed of a heat sensitive material, most preferably a bi-metallic material, but any suitable material be used. Preferably, the drive mechanism of the rotating drum is comprised of a coil spring and at least one gear. The gear ensures that the rotating drum unwinds at a measured pace. Further, the rotating drum is interchangeable allowing different songs to be played.

In an alternative embodiment, the release flap and release strip are activated by pressure. Also, in an alternative embodiment, the cams may be replaced with a plurality of orifices releasably sealed by the actuation valves. Additionally, a standard music box, well known in the art, may be used to play a song or a microchip attached to the kettle may be used to play a song.

Accordingly, it is an objective of the instant invention to disclose a novelty musical tea kettle having an incorporated flute for playing of notes.

It is another objective of the instant invention to disclose a mechanically powered musical kettle having a programmable playing device whereby musical notes may form a melody.

It is yet another objective of the instant invention to disclose a musical kettle having a replaceable playing device.

Yet another objective of the instant invention to disclose a musical kettle having actuation valves that can be programmed to opened fully, partially, or for various periods of time to provide tonal variations.

Still another objective of the instant invention to disclose a mechanically powered musical kettle that will play for a predetermined amount of time despite the temperature of the kettle contents.

Another objective of the instant invention to disclose a mechanically powered musical kettle that can be reset to play a song while the kettle is being heated or has been heated.

Yet still another objective of the instant invention to disclose a mechanically powered musical kettle that will operate as a conventional tea kettle if passively employed.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
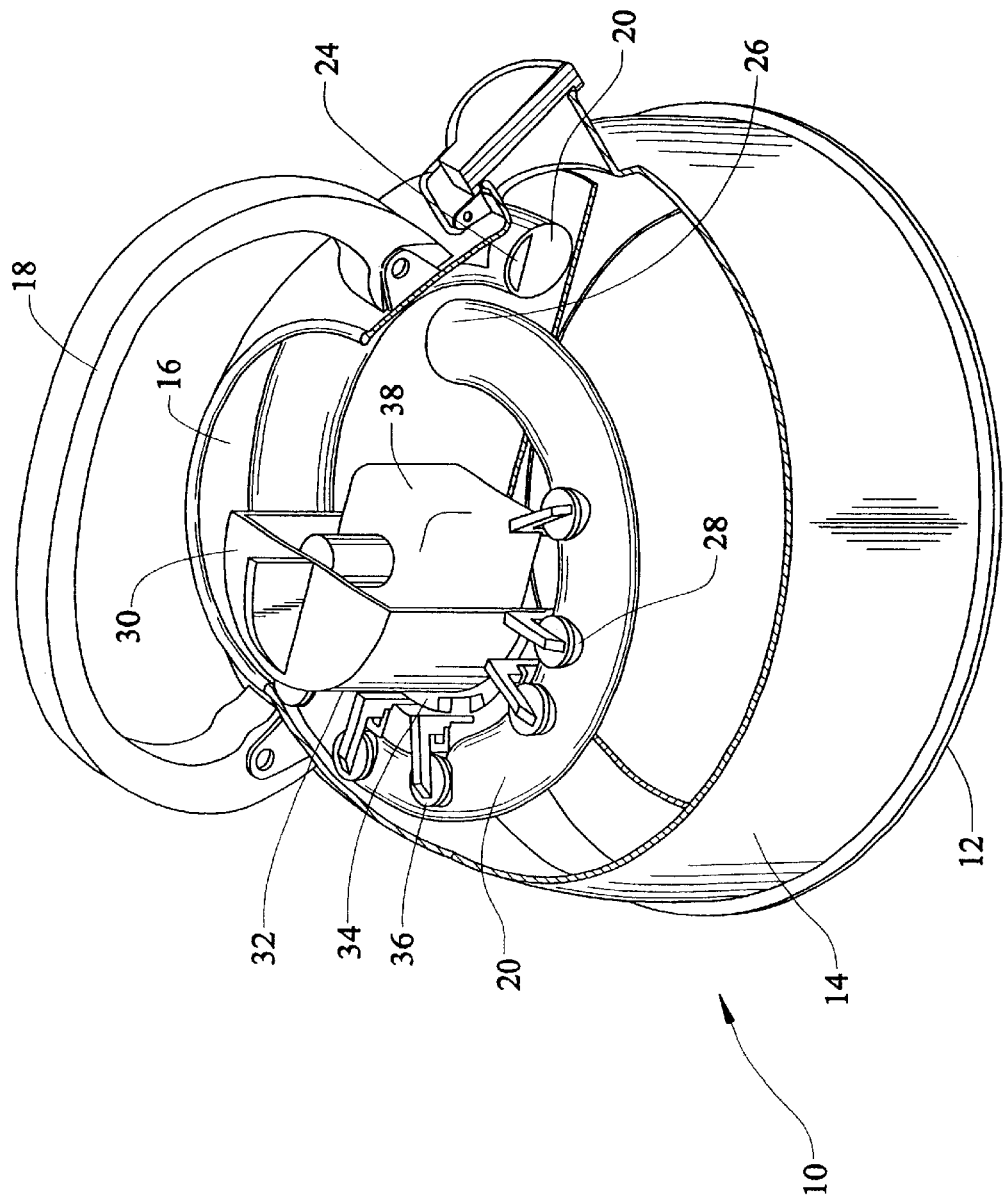
FIG. 1 is a pictorial view of the musical kettle with a cross sectional view of the rotating drum.
Figure 2:
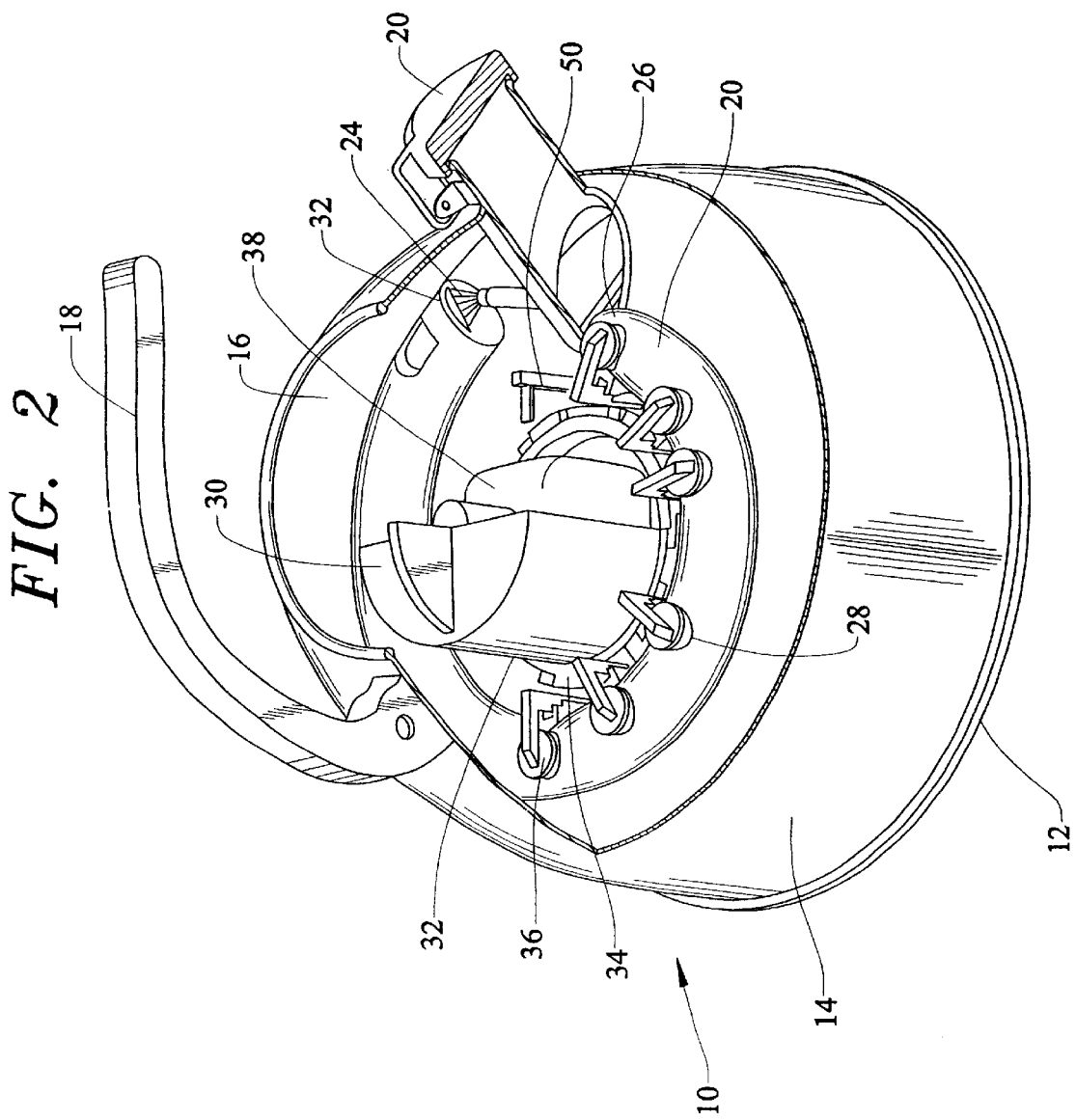
FIG. 2 is a pictorial view of the musical kettle detailing the release flap and a cross sectional view of the rotating drum.
Figure 3:
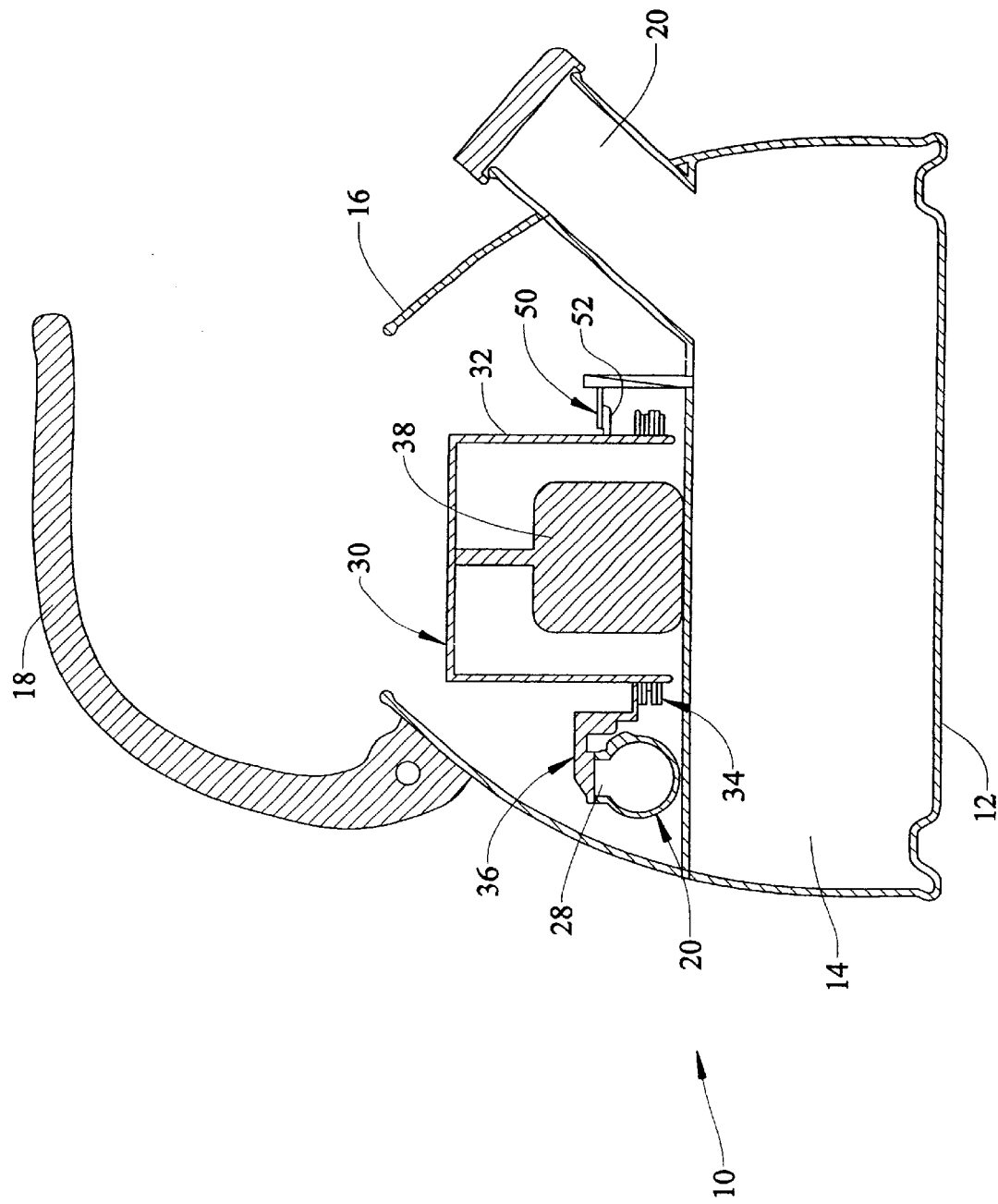
FIG. 3 is a cross sectional view of the musical kettle.

Now referring to the Figures in general, shown is the 11 kettle 10 comprising a bottom 12, body 14, partially closed top 16, handle 18, and spout 20. The body 14 of the kettle 10 has a circular instrument 20 with a first end 22 having a release flap 24, a closed second end 26, and a plurality of apertures 28 releasably sealed by a plurality of actuation valves 36. When the water boils, the release flap 24 opens allowing pressure to enter the instrument 20.

A rotating drum 30, has a plurality of cams 34 located along the drum's outer circumference 32. Each said cam 34 may be multilevel allowing the playing of different tones by varying the opening of the apertures. The rotating drum 30 is releasably attached to a drive mechanism 38.

In the preferred embodiment, the drive mechanism 38 includes a coil spring 39 coupled to a gear which operates as ratchet. The user manually winds the rotating drum 30 causing the gear to ratchet with the spring, thus activating the drive mechanism 38 before, during, or even after the kettle is heated. The gear further ensures that the coil spring unwinds at a measured pace.

Multilevel cams 34 lift the corresponding lever actuation valves 36 thus unsealing and resealing the apertures 28 on the circular instrument or flute 20. The lifted actuation valve 36 allows air pressure or steam to be released through the open aperture 28 resulting in a particular note being played. The unwinding rotating drum 30 causes the cams 34 to continually lift the corresponding actuation valves 36 which in turn unseal and reseal the corresponding apertures 28, thus playing an entire song.

The rotating drum 30 is releasably held by a rachet 50. The rachet 50 is releasably held by a release strip 52. When the water boils, the release strip 52 releases the rachet 50 which in turn releases the wound rotating drum 30. Again, as the drum 30 unwinds, the cams 34 lift the actuation valves 36 which unseal and reseal the apertures 28 along the circular instrument 10 causing steam pressure to be released and a song to be played.

The rotating drum 30 and the multilevel cams 34 may be replaced so that the kettle can play different songs. The song is programed upon the rotating drum by attaching the cams 34 at various levels. The different leveled cams 34 cause a corresponding leveled actuation valve 36 to unseal a particular aperture 28, thus producing different notes for a particular song.

In the preferred embodiment, the release flap 24 and release strip 52 are composed of a bi-metallic material. When the water is heated, the bi-metallic material releases the rachet 50 from the release strip 52 and allows air pressure to enter the circular instrument 10 past the curled up release flap 24.

In an alternative embodiment, the release flap 24 and release strip 52 are driven by steam pressure. In another alternative embodiment, the cams are replaced with orifices that are releasably sealed by the actuation valves 36. Additionally, a conventional music box or microchip may be attached to the kettle 10 to generate the song.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A musical kettle, said kettle comprising: a substantially flat bottom having a sidewall extending upward and forming a top adapted for receiving liquid therein;
   a spout formed integral to said top;
   a flute mounted to said kettle, said flute defined as a tube having a first end and a second end with at least one aperture therebetween;
   an actuation valve rotatably coupled to said aperture;
   a drive means having at least one cam for engaging said actuation valve;
      wherein the heating of a liquid in said kettle causes pressure to expand through said first end of said flute whereby operation of said drive means allows said actuation valve to open upon demand of said cam for playing a musical note.

2. The kettle according to claim 1 wherein said drive means includes a rotating drum, and said cam is a multilevel cam mounted to said drive means.

3. The kettle according to claim 2 wherein said rotating drum includes a manually wound coil spring, said coil spring is biased in position by a ratchet having a release strip to prevent unwinding.

4. The kettle of claim 2 wherein said rotating drum is interchangeable.

5. The kettle according to claim 3 wherein said release strip is a bimetallic heat sensitive tab coupled to said kettle for use in releasing said ratchet.

6. The kettle according to claim 1 wherein said second end is sealed.

7. The kettle according to claim 1 wherein said first end has a release flap for pressure control into said flute.

8. The kettle of claim 1 wherein said cam is multi-level.

9. A musical kettle, said kettle comprising: a substantially flat bottom having a sidewall extending upward and forming a top adapted for receiving liquid therein;
   a spout formed integral to said top;
   a flute mounted to said kettle, said flute defined as a cylindrical tube having a first end and a second end with at least one aperture therebetween;
   an actuation valve rotatably coupled to said aperture;
   a replaceable rotatable drum having at least one multilevel cam for engaging said actuation valve;
   a release strip for holding said drum in a fixed position;
      wherein the heating of a liquid in said kettle causes pressure to expand through said first end of said flute whereby operation of said rotatable drum allows said actuation valve to open upon demand of said cam for playing a musical note.

10. The kettle according to claim 9 wherein said multilevel cam is positioned along an outer circumference of said drum.

11. The kettle according to claim 9 wherein said rotating drum includes a manually wound coil spring, said coil spring is biased in position by a ratchet.

12. The kettle according to claim 9 wherein said release strip is a bi-metallic heat sensitive tab coupled to said kettle for use in releasing said drum.

13. The kettle according to claim 9 wherein said second end is sealed.

14. The kettle according to claim 9 wherein said first end has a release flap for pressure control into said flute.

15. The kettle according to claim 9 wherein said cam is continuous.

16. A musical kettle, said kettle comprising: a substantially flat bottom having a sidewall extending upward and forming a top adapted for receiving liquid therein;
   a spout formed integral to said top;
   a flute mounted to said kettle, said flute defined as a cylindrical tube having a first end and a sealed second end with a plurality of apertures therebetween;
   an actuation valve rotatably coupled to each of said apertures;
   a replaceable rotatable drum having an inner surface and an outer surface, said inner surface having a coil spring, said outer surface having plurality of cams, each cam positioned to engage a specific actuation valve;

wherein the heating of a liquid in said kettle causes pressure to expand through said first end of said flute whereby rotation of said drum allows said actuation valves to open upon demand of said cams for playing of musical notes.

17. The kettle according to claim 16 wherein said cams are multilevel allowing each said actuation valve to sound a various tone.

18. The kettle according to claim 16 wherein said rotating drum includes a hand level for rotation of said coil spring, said coil spring held in a wound position by a ratchet.

19. The kettle according to claim 16 including a means for activating drum rotation.

20. The kettle according to claim 16 wherein said first end includes a means for opening upon the liquid of said kettle reaching a predetermined temperature.

\* \* \* \* \*